(12) United States Patent
Sugimoto (10) Patent No.: US 11,013,080 B2
(45) Date of Patent: May 18, 2021

(54) CONTROL DEVICE, ILLUMINATION DEVICE, AND PROGRAM FOR CONTROL DEVICE

(71) Applicant: YAZAKI CORPORATION, Tokyo (JP)

(72) Inventor: Terumitsu Sugimoto, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/728,415

(22) Filed: Dec. 27, 2019

(65) Prior Publication Data
US 2020/0253018 A1 Aug. 6, 2020

(30) Foreign Application Priority Data

Jan. 31, 2019 (JP) .............................. JP2019-015526

(51) Int. Cl.
| | | |
|---|---|---|
| H05B 45/325 | (2020.01) | |
| H05B 45/10 | (2020.01) | |
| H05B 45/20 | (2020.01) | |
| H05B 47/19 | (2020.01) | |
| H05B 45/46 | (2020.01) | |

(52) U.S. Cl.
CPC ................................. *H05B 45/325* (2020.01)

(58) Field of Classification Search
CPC ........ H05B 45/10; H05B 45/20; H05B 47/19; H05B 45/37; H05B 45/46; H05B 47/105; H05B 47/185; H05B 45/48; H05B 45/50; H05B 45/00; H05B 47/10

USPC .............................. 315/186, 294, 185 R, 210
See application file for complete search history.

(56) References Cited

U.S. PATENT DOCUMENTS

| | | | |
|---|---|---|---|
| 2004/0164687 A1 | 8/2004 | Nakamura et al. | |
| 2007/0247072 A1 | 10/2007 | Norimatsu | |
| 2012/0235589 A1* | 9/2012 | Slot ........................ | H05B 47/11 315/210 |
| 2014/0055051 A1* | 2/2014 | Raval ...................... | H05B 45/37 315/193 |
| 2015/0035441 A1 | 2/2015 | Hasegawa et al. | |
| 2016/0157314 A1* | 6/2016 | Scott ....................... | H05B 45/37 315/186 |

(Continued)

FOREIGN PATENT DOCUMENTS

| | | |
|---|---|---|
| EP | 2 173 142 A1 | 4/2010 |
| JP | 2004-186085 A | 7/2004 |

(Continued)

*Primary Examiner* — Wei (Victor) Y Chan
(74) *Attorney, Agent, or Firm* — Sughrue Mion, PLLC (57) ABSTRACT

A control device including a CPU is provided. The CPU divides a plurality of pulses into first and second groups, and creates a schedule in which on-timing and off-timing of the plurality of pulses are designated such that off-timing of a first pulse among the plurality of pulses and on-timing of a second pulse among the plurality of pulses are simultaneous with each other. The CPU sets in a timer for counting time, time from a time point where the timer finishes counting the time already set to on-timing or off-timing of a pulse to be first turned on or off after the time point in accordance with the schedule. Further, the CPU turns on or off the pulse in accordance with the schedule when the timer finishes counting the set time.

11 Claims, 8 Drawing Sheets

(56) References Cited

U.S. PATENT DOCUMENTS

2017/0127487 A1    5/2017  Slot et al.
2019/0141802 A1*   5/2019  Saes .................. H05B 45/48

FOREIGN PATENT DOCUMENTS

JP    2007-290450 A    11/2007
JP     2010-92602 A     4/2010

* cited by examiner

| PORT | DUTY [100%] |
|---|---|
| ch1 | 100 |
| ch2 | 0 |
| ch3 | 50 |
| ch4 | 25 |
| ch5 | 70 |
| ch6 | 15 |
| ch7 | 80 |
| ch8 | 90 |
| ch9 | 85 |
| ch10 | 30 |
| ch11 | 40 |
| ch12 | 20 |
| ch13 | 14 |
| ch14 | 13 |
| ch15 | 11 |
| ch16 | 9.8 |
| ch17 | 4.5 |
| ch18 | 2.9 |

FIRST GROUP G1

| PORT | DUTY [100%] |
|---|---|
| ch1 | 100 |
| ch2 | 0 |
| ch3 | 50 |
| ch4 | 25 |
| ch5 | 70 |
| ch6 | 15 |
| ch7 | 80 |
| ch8 | 90 |
| ch9 | 85 |

SECOND GROUP G2

| PORT | DUTY [100%] |
|---|---|
| ch10 | 30 |
| ch11 | 40 |
| ch12 | 20 |
| ch13 | 14 |
| ch14 | 13 |
| ch15 | 11 |
| ch16 | 9.8 |
| ch17 | 4.5 |
| ch18 | 2.9 |

FIG. 6

FIRST GROUP G1

| PORT | DUTY [100%] |
|------|-------------|
| ch1  | 100         |
| ch2  | 0           |
| ch3  | 50          |
| ch4  | 25          |
| ch5  | 70          |
| ch6  | 15          |
| ch7  | 80          |
| ch8  | 90          |
| ch9  | 85          |

| PORT | DUTY [100%] |
|------|-------------|
| ch1  | 100         |
| ch8  | 90          |
| ch9  | 85          |
| ch7  | 80          |
| ch5  | 70          |
| ch3  | 50          |
| ch4  | 25          |
| ch6  | 15          |
| ch2  | 0           |

SECOND GROUP G2

| PORT | DUTY [100%] |
|------|-------------|
| ch10 | 30          |
| ch11 | 40          |
| ch12 | 20          |
| ch13 | 14          |
| ch14 | 13          |
| ch15 | 11          |
| ch16 | 9.8         |
| ch17 | 4.5         |
| ch18 | 2.9         |

| PORT | DUTY [100%] |
|------|-------------|
| ch11 | 40          |
| ch10 | 30          |
| ch12 | 20          |
| ch13 | 14          |
| ch14 | 13          |
| ch15 | 11          |
| ch16 | 9.8         |
| ch17 | 4.5         |
| ch18 | 2.9         |

FIG. 7A

FIRST GROUP G1

| PORT | DUTY [100%] | ON [µs] | OFF [µs] |
|---|---|---|---|
| ch1 | 100 | | |
| ch8 | 90 | 100 | 9300 |
| ch9 | 85 | 300 | 9000 |
| ch7 | 80 | 500 | 8700 |
| ch5 | 70 | 700 | 7900 |
| ch3 | 50 | 900 | 6100 |
| ch4 | 25 | 1100 | 3800 |
| ch6 | 15 | 1300 | 3000 |
| ch2 | 0 | 1500 | 0 |

FIG. 7B

SECOND GROUP G2

| PORT | DUTY [100%] | ON [µs] | OFF [µs] |
|---|---|---|---|
| ch11 | 40 | 0 | 4000 |
| ch10 | 30 | 0 | 3000 |
| ch12 | 20 | 0 | 2000 |
| ch13 | 14 | 0 | 1400 |
| ch14 | 13 | 0 | 1300 |
| ch15 | 11 | 0 | 1100 |
| ch16 | 9.8 | 0 | 980 |
| ch17 | 4.5 | 0 | 450 |
| ch18 | 2.9 | 0 | 290 |

FIG. 7C

| PORT | DUTY [100%] | ON [µs] | OFF [µs] |
|---|---|---|---|
| ch11 | 40 | 6100 | 10100 |
| ch10 | 30 | 7900 | 10900 |
| ch12 | 20 | 8700 | 10700 |
| ch13 | 14 | 9000 | 10400 |
| ch14 | 13 | 9300 | 10600 |
| ch15 | 11 | 9500 | 10600 |
| ch16 | 9.8 | 9700 | 10680 |
| ch17 | 4.5 | 9900 | 10350 |
| ch18 | 2.9 | 10100 | 10390 |

FIG. 7D

| PORT | DUTY [100%] | ON [µs] | OFF [µs] |
|---|---|---|---|
| ch1 | 100 | 10390 | |
| ch8 | 90 | 10350 | 19350 |
| ch9 | 85 | 10680 | 19180 |
| ch7 | 80 | 10600 | 18600 |
| ch5 | 70 | 10600 | 17600 |
| ch3 | 50 | 10400 | 15400 |
| ch4 | 25 | 10700 | 13200 |
| ch6 | 15 | 10900 | 12400 |
| ch2 | 0 | | 0 |

CONTROL DEVICE, ILLUMINATION DEVICE, AND PROGRAM FOR CONTROL DEVICE

CROSS-REFERENCE TO RELATED APPLICATIONS

This application is based on and claims priority under 35 USC 119 from Japanese Patent Application No. 2019-015526 filed on Jan. 31, 2019, the contents of which are incorporated herein by reference.

TECHNICAL FIELD

The present invention relates to a control device that outputs a plurality of pulses each having a duty set independently, an illumination device in which a light source is controlled by the control device, and a program for the control device.

BACKGROUND ART

Conventionally, a pulse width modulation (PWM) control has been used to control a light source of an automobile as a plurality of loads described above (Patent Literatures 1, 2). By controlling the light source by the PWM control, brightness of the light source can be easily changed. Specifically, the brightness can be adjusted by changing a pulse width for one cycle. In addition, by gradually changing to a target duty, the light source can be gradually brightened or darkened.

The PWM control described above is performed using a PWM function of a general-purpose microcomputer. In the PWM function, a CPU of the microcomputer turns on (rises) a pulse and causes a timer to count time from on to off (fall) of the pulse based on the set duty. When the timer count ends, the CPU turns off the pulse, and then causes the timer to count the time from when the pulse is turned off to the end of one cycle of the pulse. When the timer count ends, the CPU then turns on the pulse again and repeats the above-described operation.

The CPU is provided with a plurality of ports so that a plurality of pulses can be output. In addition, the duties of the plurality of pulses can be set optionally. However, with the use of the timer described above, the timers are required for the number of ports, and it is necessary to use an expensive CPU, which is a problem in terms of cost.

In the PWM control described above, there is a problem that high frequency noise is generated when the pulse is turned on or off.

CITATION LIST

Patent Literature

Patent Literature 1: JP-A-2007-290450
Patent Literature 2: JP-A-2004-186085

SUMMARY OF INVENTION

The present invention has been made in view of the above-described circumstances, and an object thereof is to provide a control device, an illumination device, and a program for a control device in consideration of noise at low cost.

In order to achieve the above object, a control device, an illumination device, and a program for a control device according to the present invention are characterized by the following [1] to [10].

[1] A control device that outputs a plurality of pulses each having a duty set independently, the control device including:
a schedule creation section configured to create a schedule in which on-timing and off-timing of the plurality of pulses are designated such that off-timing of a first pulse among the plurality of pulses and on-timing of a second pulse among the plurality of pulses are simultaneous with each other, based on the set duty and a cycle of the pulse;
a setting section configured to set, in a timer for counting time, time from a time point where the timer finishes counting the time already set to on-timing or off-timing of a pulse to be first turned on or off after the time point in accordance with the schedule; and a pulse output section configured to turn on or off the pulse in accordance with the schedule when the timer finishes counting the set time.

[2] The control device according to [1],
wherein the schedule creation section creates a schedule for the first pulse, and creates a schedule for the second pulse such that the off-timing of the first pulse designated by the schedule created for the first pulse and the on-timing of the second pulse are simultaneous with each other.

[3] The control device according to [1],
wherein the schedule creation section divides the plurality of pulses into first and second groups, and includes a first schedule creation section and a second schedule creation section,
wherein the first schedule creation section creates the schedule by selecting the first pulse from one of the first and second groups and selecting the second pulse from another of the first and second groups,
wherein the second schedule creation section creates the schedule by selecting the first pulse from the other of the first and second groups and selecting the second pulse from the one of the first and second groups, and
wherein the first schedule creation section and the second schedule creation section alternately create a schedule.

[4] The control device according to [3],
wherein the schedule creation section creates the schedule such that all the pulses of the group in which the first pulse is selected from the first and second groups are turned on in the first half of one cycle, and all the pulses of the group in which the second pulse is selected from the first and second groups are turned on in the latter half of the one cycle of the first pulse.

[5] The control device according to [3],
wherein the schedule creation section does not select, as the first pulse, the pulse that is turned off in the first half of the one cycle in the group in which the first pulse is selected from the first and second groups.

[6] The control device according to [3],
wherein the schedule creation section creates the schedule in which on-timing of a remaining pulse, that is not selected as the second pulse in the group in which the second pulse is selected from the first and second group, is shifted at a constant interval.

[7] An illumination device including:
the control device according to any one of [1] to [6]; and
a plurality of light sources controlled by a plurality of pulses output from the control device.

[8] A control method for a control device that outputs a plurality of pulses each having a duty set independently, the control method comprising:

a schedule creation step configured to create a schedule in which on-timing and off-timing of the plurality of pulses are designated such that off-timing of a first pulse among the plurality of pulses and on-timing of a second pulse among the plurality of pulses are simultaneous with each other, based on the set duty and a cycle of the pulse, a setting step configured to set, in a timer for counting time, time from a time point where the timer finishes counting the time already set to on-timing or off-timing of a pulse to be first turned on or off after the time point in accordance with the schedule, and a pulse output step configured to turn on or off the pulse in accordance with the schedule when the timer finishes counting the set time.

[9] The control method according to [8], wherein the setting step and the pulse output step are performed as an interrupt processing by interrupting the schedule creation section, every time the timer finishes counting the set time.

[10] A computer readable storage medium on which a program for a control device so as to executing the control method according to [8] or [9] by a computer is stored.

According to the control device having the above configurations, the plurality of pulses, each of which the duty is independently controlled, can be output by the at least one timer. In addition, since the off-timing of the first pulse is simultaneous with the on-timing of the second pulse, on/off states of the first and second pulses cancel each other, and an amount of change in a voltage of the pulse becomes gradual, so that high frequency noise can be reduced.

According to the control device having the above configuration [4], the phases of the pulse of the first group and the pulse of the second group can be shifted by the half cycle, and the high frequency noise can be reduced in a state where the set duty is substantially maintained.

According to the control device having the above configuration [5], the phases of the pulse of the first group and the pulse of the second group can be easily shifted by the half cycle.

According to the control device having the above configuration [6], since the on-timing of the remaining pulse can be shifted, the high frequency noise can be further reduced.

According to the control device having the above configuration [7], the plurality of light sources can be controlled.

According to the control method for the control device having the above configuration [9], it can be easily executed by one control device.

According to the present invention, it is possible to provide the control device, the illumination device, and the program for the control device in consideration of the noise at the low cost.

The present invention has been briefly described above. Further, details of the present invention will be clarified by reading a mode (hereinafter, referred to as "embodiment") for carrying out the invention to be described below with reference to accompanying drawings.

DESCRIPTION OF EMBODIMENTS

A specific embodiment according to the present invention will be described below with reference to drawings.

Figure 1:
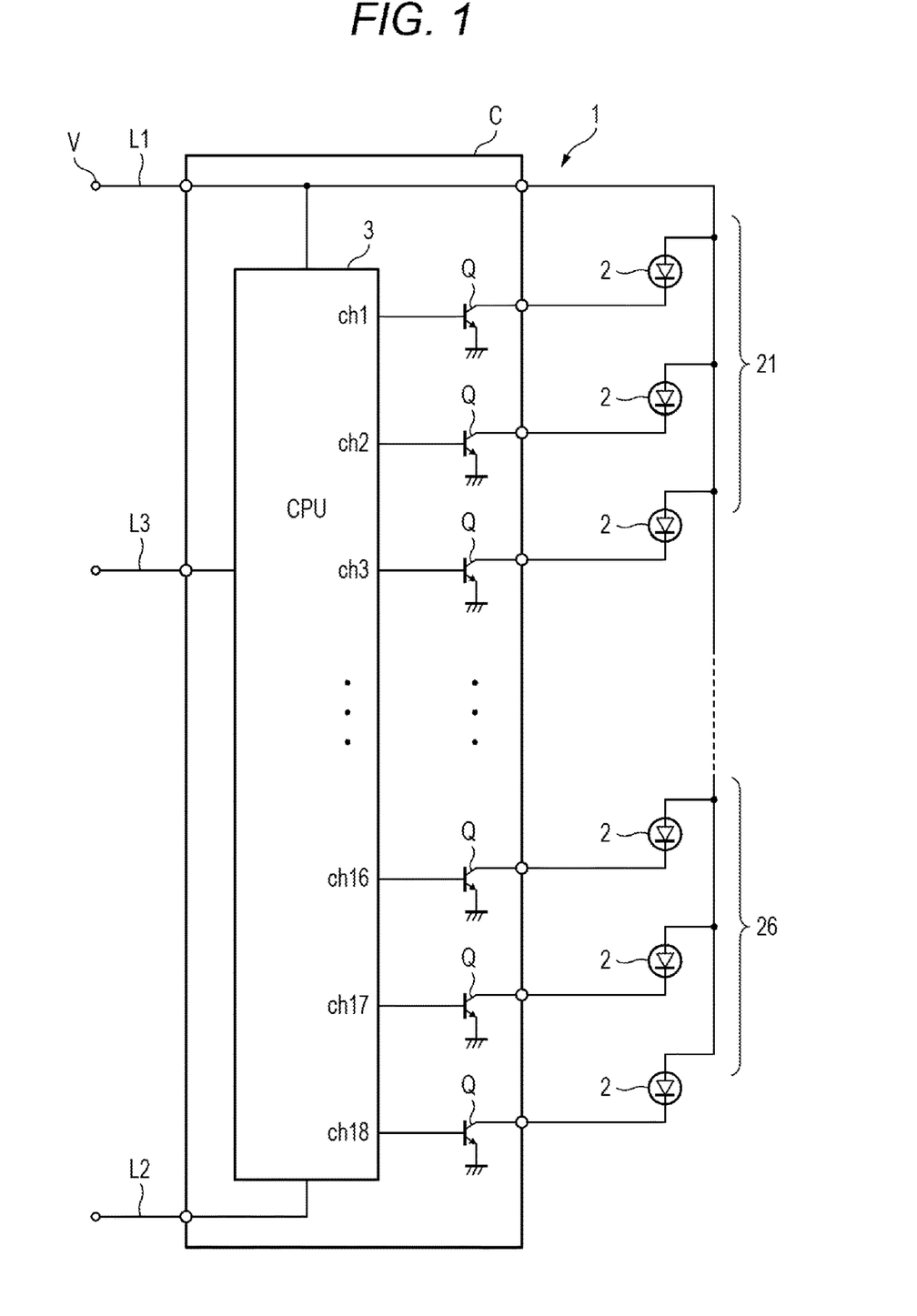
FIG. 1 is a circuit diagram showing an embodiment of an illumination device incorporating a CPU as a control device of the present invention.

An illumination device 1 incorporating a CPU 3 as a control device of the present invention will be described with reference to FIG. 1. The illumination device 1 of the present embodiment is a device configured to PWM-control a plurality of LEDs (light sources) 2 mounted in a vehicle interior of an automobile, for example. As shown in FIG. 1, the illumination device 1 includes the plurality of LEDs 2, a plurality of FETQs, and the CPU 3 used as the control device.

In the present embodiment, 18 LEDs 2 are provided. The plurality of LEDs 2 are provided with six full-color LEDs 21 to 26 configured by three-color LEDs 2 of red, green, and blue. The full-color LEDs 21 to 26 emit light in full color by adjusting brightness of the three-color LEDs 2. Anodes of the plurality of LEDs 2 are connected in common and are connected to a power source V.

The plurality of FETQs are provided in the same number 18 as the plurality of LEDs 2, and the FETQs and the LEDs 2 are provided in a one-to-one correspondence. Each of the plurality of FETQs has a drain connected to a cathode of the corresponding LEDs 2, and a source connected to the ground. As a result, when the FETQ is turned on, the power source V is supplied to the LED 2 so as to turn on the LED 2, and when the FETQ is turned off, the power source V to the LED 2 is cut off so as to turn off the LED 2.

The CPU 3 as the control device outputs PWM controlled pulses from the plurality of ports ch1 to ch18, respectively. Gates of the FETQs are connected to the ports ch1 to ch18, respectively. The CPU 3 can adjust the brightness of each of the plurality of LEDs 2 independently by outputting the plurality of PWM controlled pulses. Accordingly, for example, colors of the full-color LEDs 21 to 26 can be adjusted manually by a user, or the colors of the full-color LEDs 21 to 26 can be automatically changed in accordance with a predetermined trigger such as when a door is opened and/or closed.

In the present embodiment, the CPU 3 and the plurality of FETQs described above are incorporated in a housing of a connector C for connecting electric wires, such as a power supply line L1 and a ground line L2, to the LEDs 2. In addition, a communication line L3 is connected to the connector C, and the CPU 3 and an external control device can communicate with each other.

The colors of the full-color LEDs 21 to 26 described above are changed manually or automatically at any timing as described above. In addition, a table showing a relationship between the colors and duties of the three-color LEDs 2 is stored in advance in a storage unit (not shown). Every time the color is changed, the CPU 3 obtains the duty of each of the three-color LEDs 2 corresponding to the changed color with reference to the table. Then, the CPU 3 changes a setting of the obtained duty as a duty of a pulse to be output to each of the three-color LEDs 2. Incidentally, the change in the setting of the duty using the above-described table may be performed by the external control device, and a result thereof may be transmitted to the CPU 3.

Figure 2:
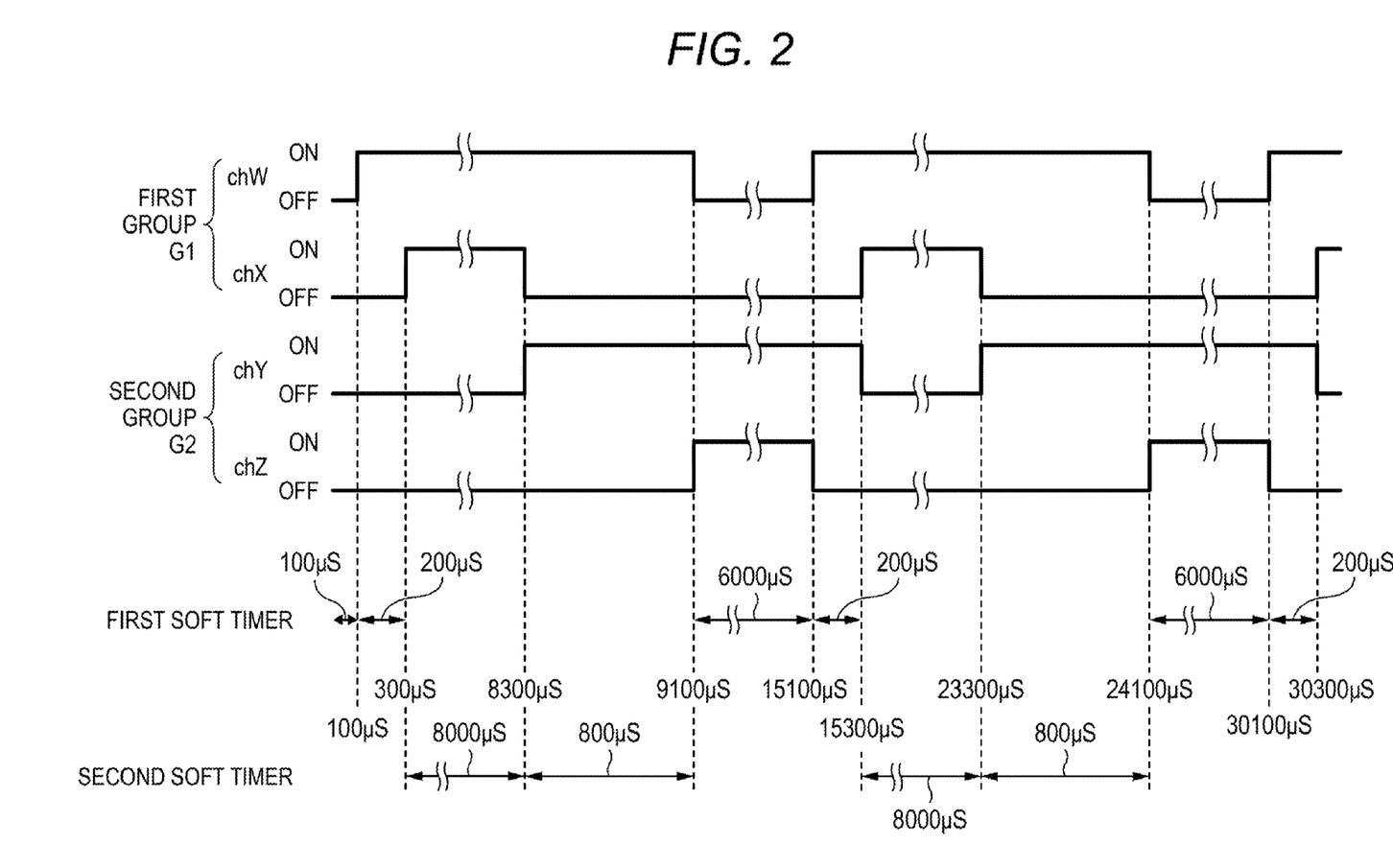
FIG. 2 is a time chart of pulses output from ports chW, chX, chY and chZ and time set in a timer for simply explaining an operation of the illumination device shown in FIG. 1.

Next, an outline of an operation of the illumination device 1 having the above-described configuration will be described with reference to FIG. 2. In the embodiment shown in FIG. 1, the 18 ports ch1 to ch18 are provided in the CPU 3, but here, in order to simplify the description, an example in which a total of four ports chW, chX, chY and chZ are provided in the CPU 3, and duties 90%, 80%, 70% and 60% are respectively set to the ports chW, chX, chY and chZ will be described. In addition, it is assumed that the pulses output from the ports chW to chZ have the same frequency of 10000 μs.

First, based on the set duties and a cycle of the pulses, the CPU 3 creates a schedule in which on-timing and off-timing of the pulse are designated. More specifically, as shown in FIG. 2, the CPU 3 divides the pulses from the ports chW to chZ into first and second groups G1, G2. In the present embodiment, the pulses from the ports chW, chX are set to the first group G1, and the pulses from the ports chY, chZ are set to the second group G2.

Figure 8:
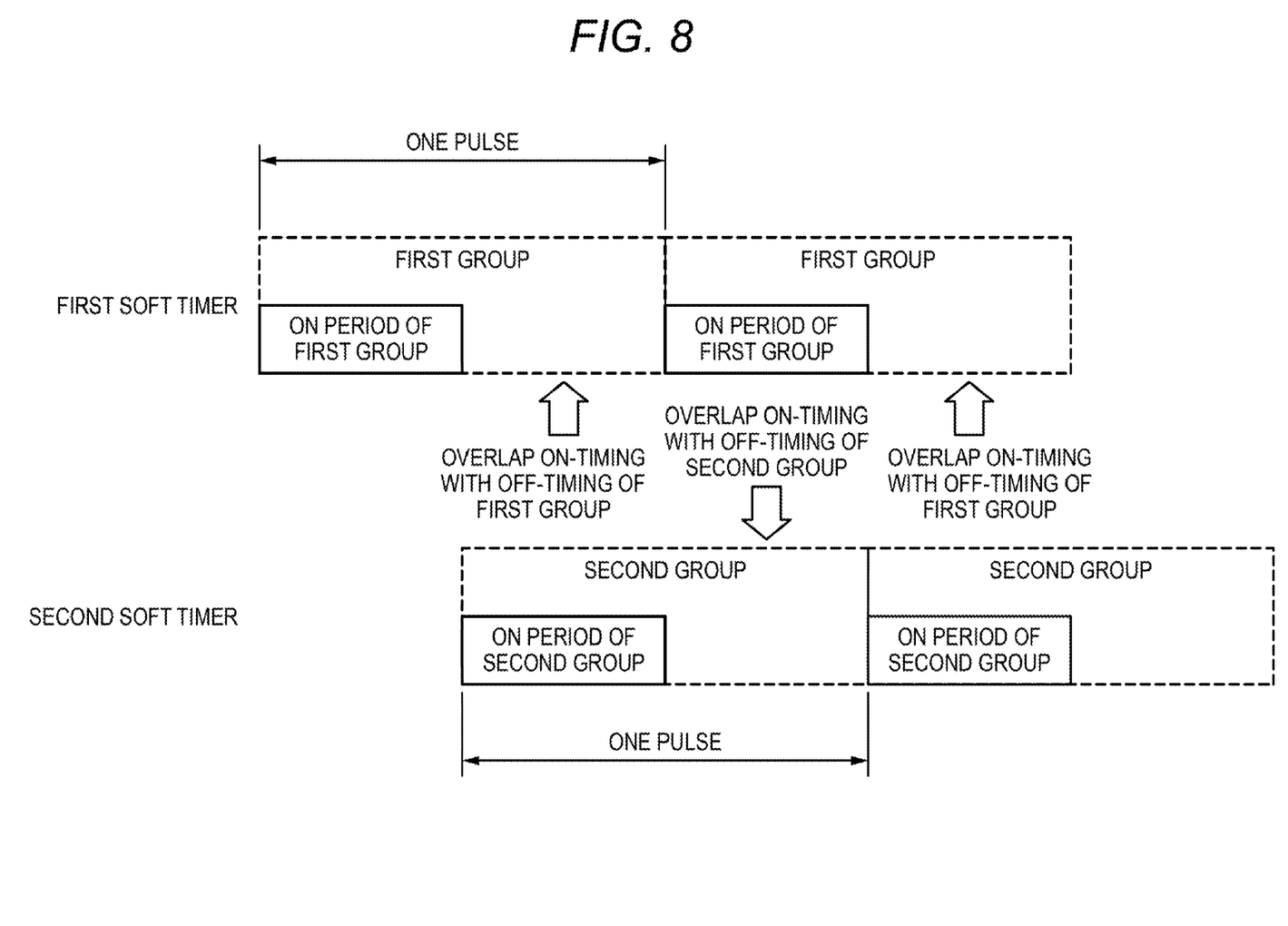
FIG. 8 is an explanatory diagram for explaining the operations of the main processing and the interrupt processing shown in FIG. 1.

Then, as shown in FIG. 8, the CPU 3 shifts phases of the pulse of the first group G1 and the pulse of the second group G2 by a half cycle. Accordingly, the CPU 3 can create the schedule in which the off-timing of the pulse of the first group G1 and the on-timing of the pulse of the second group G2 are simultaneous with each other, and the off-timing of the pulse of the second group G2 and the on-timing of the pulse of the first group G1 are simultaneous with each other.

The creation of the schedule will be described with reference to an example shown in FIG. 2. The CPU 3 creates the schedule in which the on-timing of the pulses from the first ports chW, chX is shifted by a constant interval (=200 μs). That is, the schedule is created in which the pulses from the ports chW, chX are sequentially turned on at timing of 100 μs and 300 μs, and are sequentially turned off at timing of 9100 μs (=100 μs+10000 μs×0.9) and 8300 μs (=300 μs+10000 μs×0.8).

Next, the CPU 3 creates a schedule for the second group G2 so as to turn on the pulses from the second group G2 at the off-timing of the pulses from the ports chW, chX of the first group G1. That is, the schedule is created in which the pulses from the ports chY, chZ are sequentially turned on at the timing of 8300 μs and 9100 μs, and sequentially turned off at timing of 15300 μs (=8300 μs+10000 μs×0.7) and 15100 μs (=9100 μs+10000 μs×0.6).

Next, the CPU 3 creates a schedule for the first group G1 so as to turn on the pulses from the first group G1 at the off-timing of the pulses from the ports chY, chZ of the second group G2. That is, the schedule is created in which the pulses from the ports chW, chX are sequentially turned on at the timing of 15100 μs and 15300 μs, and sequentially turned off at timing of 24100 μs (=15100 μs+10000 μs×0.9) and 23300 μs (=15300 μs+10000 μs×0.8). Hereinafter, similarly, the CPU 3 alternately creates the schedule for the first group G1 and the schedule for the second group one pulse at a time.

The CPU 3 outputs the pulses from the ports chW to chZ in accordance with the schedules created as described above. In the present embodiment, the CPU 3 performs the PWM control using two first and second soft timers that respectively count the on-timing of the first group G1 and the on-timing of the second group. Specifically, as shown in FIG. 2, the CPU 3 sets the first soft timer to 100 μs, and sets the pulse from the port chW as a pulse to be first turned on. When the soft timer finishes counting 100 μs, the CPU 3 turns on the pulse from the port chW. Subsequently, the CPU 3 sets the pulse from the port chX as the pulse to be first turned on after the time point from the end of the timing, and sets the first soft timer to time of 200 μs (=300 μs−100 μs) until the pulse from the port chX is turned on.

Thereafter, when the soft timer finishes counting 200 μs, the CPU 3 turns on the pulse from the port chX. Next, the CPU 3 sequentially sets 8000 μs and 800 μs in the second soft timer, turns on the pulses from the ports chY, chZ, and simultaneously turns off the pulses from the ports chW, chX in accordance with the schedule created described above, every time the second soft timer counts the set time, and repeats the same operation as follows.

Figure 3:
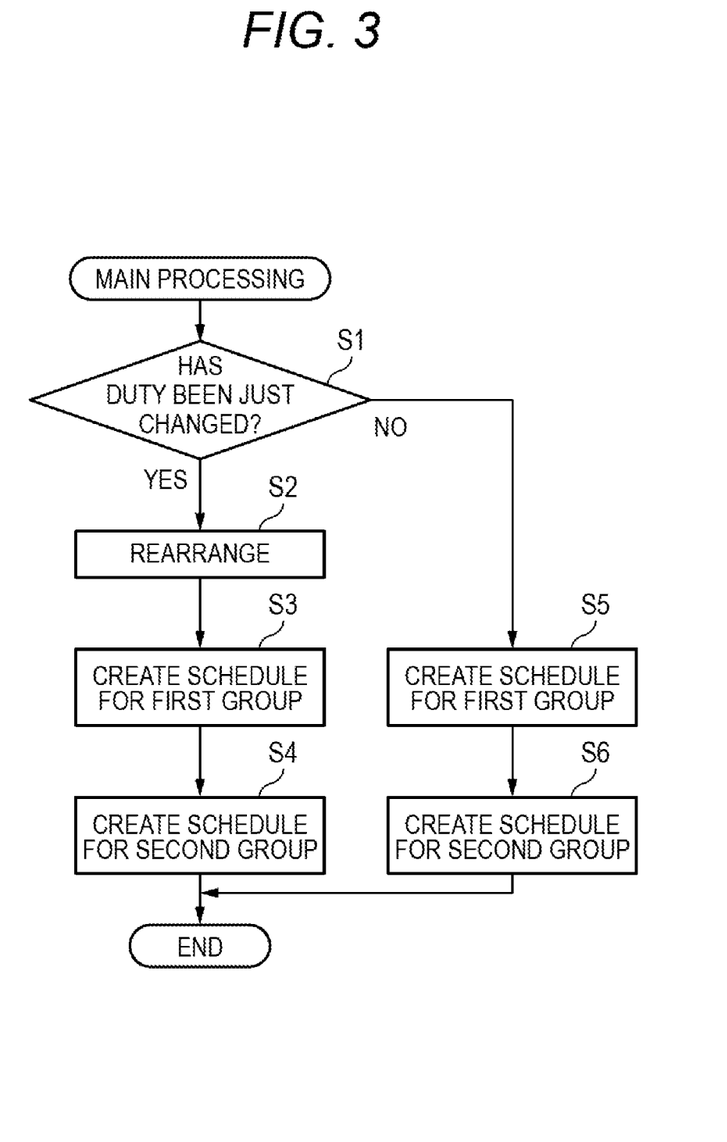
FIG. 3 is a flow chart showing a main processing procedure executed by the CPU shown in FIG. 1.
Figure 4:
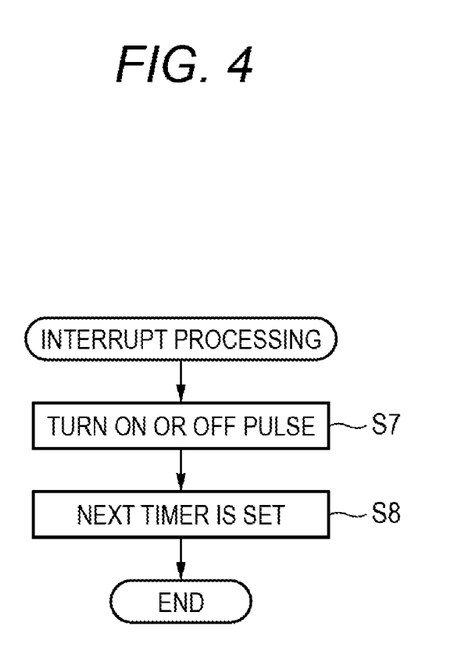
FIG. 4 is a flow chart showing an interrupt processing procedure executed by the CPU shown in FIG. 1.

Next, a detailed operation of the illumination device 1 described above will be described with reference to FIGS. 3 to 8. Programs for a main processing shown in FIG. 3 and an interrupt processing shown in FIG. 4 are stored in a storage medium (not shown). The CPU 3 executes these programs to realize the main processing and the interrupt processing. The pulses output from the ports ch1 to ch18 described above are all output at the same cycle (for example, 10000 μs). The CPU 3 executes the main processing shown in FIG. 3 for each cycle of the pulse described above.

First, the CPU 3 divides the plurality of pulses output from the ports ch1 to ch18 into first and second groups G1, G2 prior to the main processing and interrupt processing described above. At this time, the CPU 3 divides the number of pulses of the first group G1 into the same number as the number of pulses of the second group G2 as much as possible.

Figure 5:
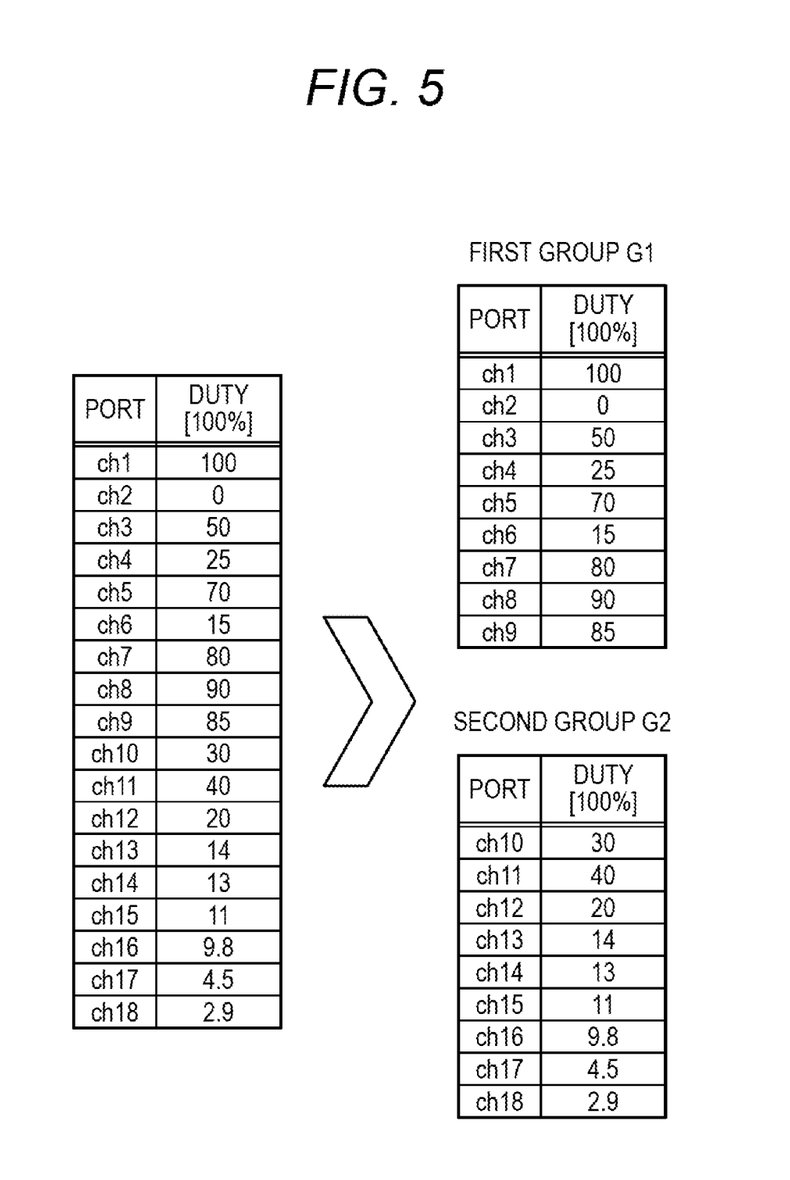
FIG. 5 is an explanatory diagram for explaining a grouping operation executed by the CPU.

More specifically, when the number of ports is an even number, the CPU 3 groups the first and second groups G1, G2 such that the numbers of pulses of the first and second groups G1, G2 are the same. On the other hand, when the number of ports is an odd number, the first and second groups G1, G2 are grouped such that the number of pulses of one of the first and second groups G1, G2 is larger than that of the other group by one. In the present embodiment, as shown in FIG. 5, the CPU 3 sets the pulses from the ports ch1 to ch9 as the first group G1, and the pulses from the ports ch10 to ch18 as the second group G2.

Figure 6:
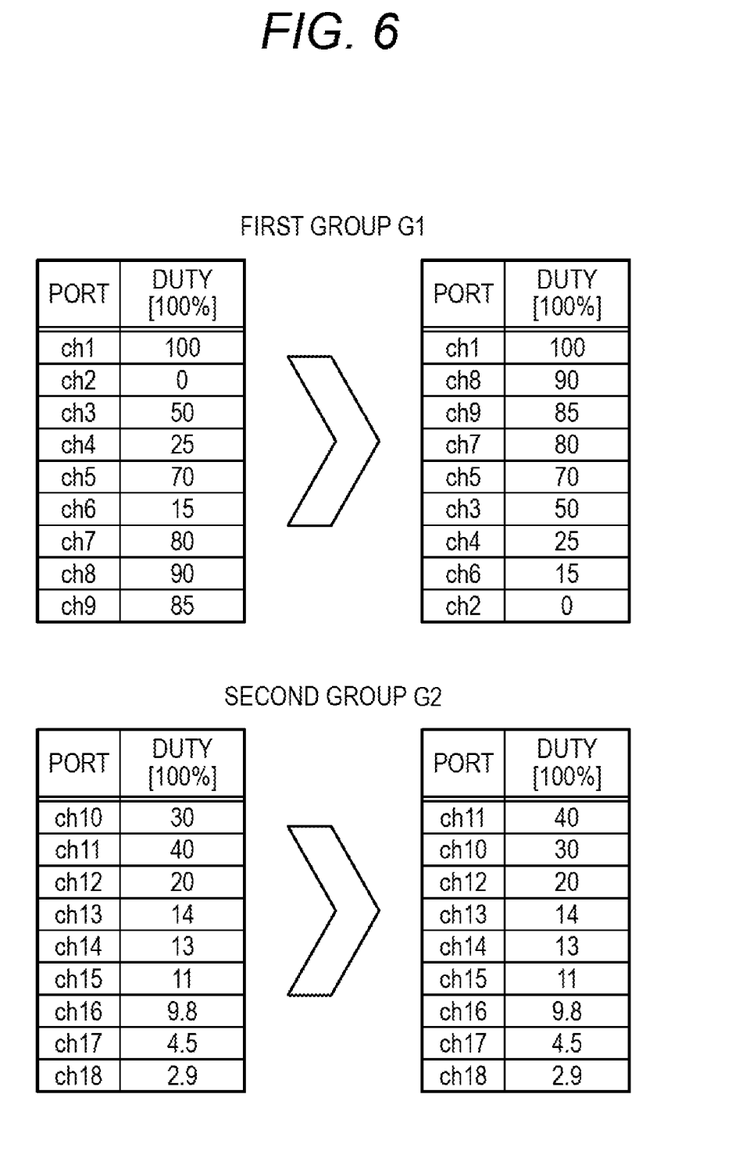
FIG. 6 is an explanatory diagram for explaining an operation of rearranging first and second groups executed by the CPU.

Thereafter, in the main processing, the CPU 3 first determines whether or not the duty has just been changed in any one of the pulses from the ports ch1 to ch18 (step S1). In a case where it is determined that the duty has just been changed (that is, in a case where the main process is executed first after the duty is changed), as shown in FIG. 6, the CPU 3 rearranges the first and second groups G1, G2 in an order of a value of the changed duty (step S2). Thereafter, the CPU 3 proceeds to step S3.

In step S3, the CPU 3 creates the schedule for the first group G1. First, the CPU 3 creates the schedule in which the on-timing is shifted at the constant interval in an arrangement order of all the pulses in the first group G1. At this time, the CPU 3 creates the schedule such that all the pulses of the first group G1 are turned on in the first half (0 μs to 5000 μs) of the one cycle.

In the present embodiment, the CPU 3 creates the schedule in which the on-timing is shifted at the constant interval of 200 μs. In an example shown in FIG. 7A, the CPU 3 designates the on-timing of the pulse of the port ch1 having the largest duty among the first group G1 to, for example, 100 µs. Similarly, the CPU 3 sets the on-timing of the pulses of the ports ch8, ch9, . . . , and ch6 having the second, third, . . . , and eighth largest duty to 300 µs, 500 µs, . . . , and 1500 µs. Incidentally, the CPU 3 does not designate the on-timing of the pulse from the port ch2 having the duty of 0%.

Figure 7A:
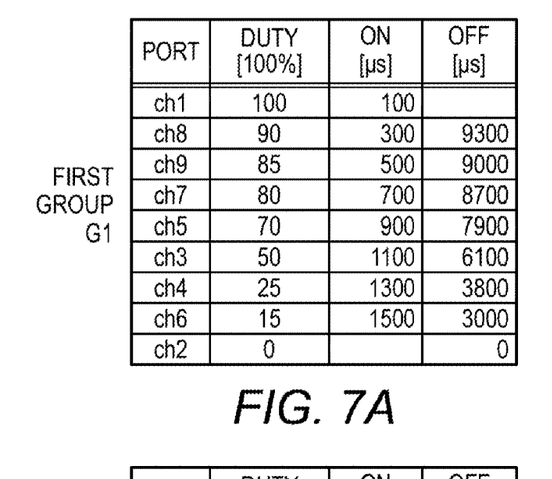
FIG. 7A to 7D are explanatory diagrams for explaining an operation of the main processing shown in FIG. 1.

Next, the CPU 3 designates the off-timing of the pulses of the first group G1 based on the set duties and the cycle of the pulses. As shown in FIG. 7A, the CPU 3 designates 300 µs+one cycle (10000 µs)×0.9=9300 µs as the off-timing for the pulse from the port ch8 of which the on-timing is 300 µs and the duty is 90%.

Similarly, the CPU 3 obtains the off-timing of the pulses of all the ports ch1 to ch9 of the first group G1, creates the schedule for the first group G1, and ends step S3. Incidentally, the CPU 3 does not designate the off-timing for the pulse from the port ch1 having the duty of 100%. In addition, the CPU 3 designates the off-timing of the pulse from the port ch2 having the duty of 0% to 0 µs.

Next, the CPU 3 creates the schedule for the second group G2 such that the off-timing of the pulse designated in the schedule for the first group G1 created in step S3 becomes the on-timing (step S4), and ends the processing.

Figure 7B:
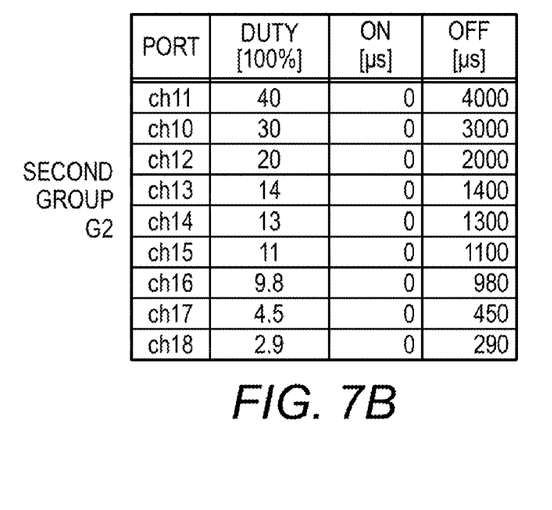

An operation of the CPU 3 in step S4 will be described in detail. First, as shown in FIG. 7B, the CPU 3 designates the on-timing of the pulses of the second group G2 to 0 µs, and designates the off-timing based on the set duties. In an example shown in FIG. 7B, the CPU 3 designate one cycle×0.4=4000 µs as the off-timing for the pulse of the port ch11 having the duty of 40%. Similarly, the CPU 3 designates the off-timing of the pulses of all the ports ch10 to ch18 of the second group G2.

Thereafter, the CPU 3 corrects the schedule for the second group G2 such that the off-timing of the pulses designated by the schedule for the first group G1 created in step S1 is simultaneous with the on-timing of the pulses of the second group G2. At this time, the CPU 3 creates the schedule such that all the pulses of the second group G2 are turned on in the latter half of the one cycle of the pulse of the first group G1 (5000 µs to 10000 µs).

In the example shown in FIG. 7A, the pulses of the first group G1 turned off in the latter half of the one cycle are pulses from the ports ch8, ch9, ch7, ch5, and ch3. The CPU 3 selects the pulses from the ports ch8, ch9, ch7, ch5, and ch3 in the first group G1 as a "first pulse".

Figure 7C:
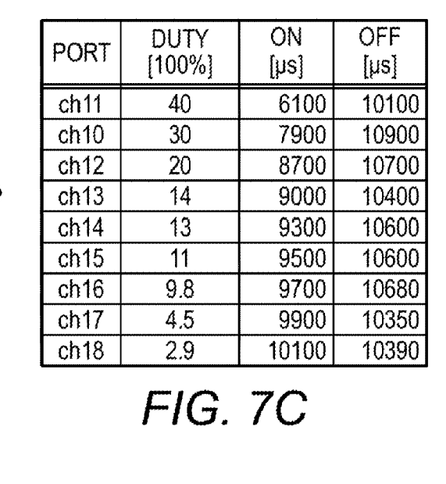

Then, the schedule is created such that the pulse having a larger duty of the second group G2 is turned on at the off-timing of the pulse having a smaller duty of the first group G1. In the example shown in FIGS. 7A to 7D, as shown in FIGS. 7A and 7C, the pulse from the port ch11 of the second group G2 is designated as the on-timing of 6100 µs (the timing at which the pulse from the port ch3 of the first group G1 is turned off). Similarly, the on-timing of the pulses from the ports ch10, ch12, ch13, and ch14 of the second group G2 are designated to 7900 µs, 8700 µs, 9000 µs, and 9300 µs that are the timing at which the pulses from the ports ch5, ch7, ch9, and ch8 of the first group G1 are turned off, respectively. That is, the CPU 3 selects the pulses from the ports ch11, ch10, ch12, ch13, and ch14 in the second group G2 as a "second pulse".

The CPU 3 does not select the pulses from the ports ch4, ch6 that are turned off in the first half of the one cycle (0 µs to 5000 µs) as the "first pulse". That is, there is no pulse of the second group G2 turned on at the off-timing of the pulses from the ports ch4, ch6. As a result, as shown in FIG. 8, the phases of the pulse of the first group G1 and the pulse of the second group G2 can be shifted by the half cycle.

The pulses of the second group G2 include a "remaining pulse" (the pulses from the ports ch15, ch16, ch17, and ch18) that is not selected as the "second pulse", and of which the on-timing is not simultaneous with the off-timing of the pulse of the first group G1. The "remaining pulse" is designated by shifting the on-timing from the timing at which the pulse from the port ch14 is turned on (9300 µs) at the constant interval (for example, 200 µs). That is, for the pulses from the ports ch15, ch16, ch17, and ch18, 9500 µs, 9700 µs, 9900 µs, and 10100 µs are designated as the on-timing, respectively. Incidentally, the pulse from the port ch14 is a pulse having the latest on-timing among the pulses of the second group G2 of which the on-timing is simultaneous with the off-timing of the pulses of the first group G1.

Thereafter, the CPU 3 designates the off-timing of the pulses from the ports ch9 to ch18 based on the set duties and the designated on-timing. Accordingly, the CPU 3 designates 10100 µs (6100 µs+one cycle×0.4) as the off-timing with respect to the pulse from the port ch11. Similarly, the CPU 3 designates the off-timing for the ports ch10, ch12 to ch18, and ends the creation of the schedule for the second group G2. As described above, the CPU 3 functions as a first schedule creation section in steps S3 and S4.

On the other hand, in the CPU 3, in a case where it is determined that it is not immediately after the duty is changed (N in step S1), the CPU 3 proceeds to step S5. In step S5, the CPU 3 creates the schedule for the first group G1 such that the off-timing of the pulse of the second group G2 in which the schedule is created in step S4 or step S6 of the previous main processing is simultaneous with the on-timing of the pulse of the first group G1. At this time, the CPU 3 creates the schedule such that all the pulses in the first group G1 is turned on in the latter half (10000 µs to 15000 µs) of the one cycle of the pulse of the second group G2 in which the schedule is created in step S4 or step S6 of the previous main processing. Incidentally, in the example shown in FIG. 7C, all the pulses in the second group G2 are turned off in the latter half (10000 µs to 15000 µs) of the one cycle.

Figure 7D:
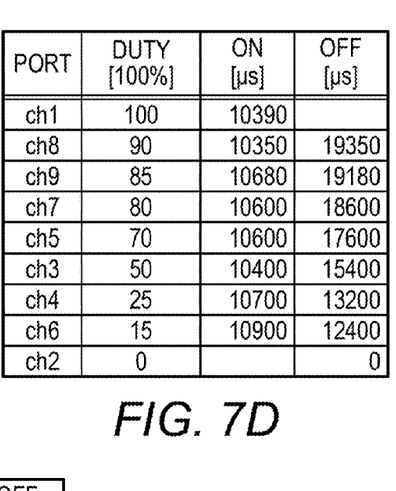

The CPU 3 creates the schedule such that the pulse having a smaller duty of the first group G1 is turned on at the off-timing of the pulse having a larger duty of the second group G2. In the example shown in FIG. 7, as shown in FIGS. 7C and 7D, the pulse from the port ch1 of the first group G1 is designated as the on-timing of 10390 µs (the timing at which the pulse from the port ch18 of the second group G2 is turned off). Similarly, the on-timing of the pulses from the ports ch8, ch9, ch7, ch5, ch3, ch4, and ch6 of the first group G1 are designated to 10350 µs, 10680 µs, 10600 µs, 10600 us, 10400 us, 10700 us, and 10900 µs that are the timing at which the pulses from the ports ch17, ch16, ch15, ch14, ch13, ch12, and ch10 of the first group G2 are turned off, respectively. Incidentally, the CPU 3 does not designate the on-timing for the pulse from the port ch2 having the duty of 0%.

That is, the CPU 3 selects the pulses from the ports ch18, ch17, ch16, ch15, ch14, ch13, ch12, and ch10 of the second group G2 as the "first pulse", and the pulses from the ports ch1, ch8, ch9, ch7, ch5, ch3, ch4, and ch6 of the first group G1 are selected as the "second pulse". In addition, in step S4 or step S6 of the previous main processing, and in present step S5, the CPU 3 functions as a second schedule creation section.

Next, the CPU 3 creates the schedule for the second group G2 such that the off-timing of the pulse designated in the schedule for the first group G1 created in step S5 becomes the on-timing (step S6), and ends the processing. That is, in steps S5 and S6, the CPU 3 functions as the first schedule creation section. Since the processing of the CPU 3 in step S6 is the same as that in step S4 described above, a detailed description thereof is omitted here.

On the other hand, the CPU 3 stops the above-described main processing every time the first or second soft timer finishes the counting, and executes the interrupt processing shown in FIG. 4. In the interrupt processing, the CPU 3 functions as a pulse output section, and turns on or off the pulses of the ports ch1 to ch18 set in step S8 to be described later (step S7).

Thereafter, the CPU 3 functions as a setting section, and sets a pulse to be turned on or off next to the pulse that is turned on or off in step S7 in accordance with the schedule created in the previous cycle of the schedule that is currently created in the main processing (step S8). In addition, the CPU 3 sets the time until the set next pulse is turned on or off in the first or second soft timer (step S8), and ends the processing. After the interrupt processing is completed, the CPU 3 continues the main processing. In step S8, as shown in FIG. 8, the CPU 3 sets the time until the pulse of the first group G1 is turned on in the first soft timer, and sets the time until the pulse of the second group G2 is turned on in the second soft timer.

According to the embodiment described above, the plurality of pulses of which the duties are independently controlled by the two first and second soft timers can be output. In addition, since the off-timing of the first pulse selected from one of the first and second groups G1, G2 is simultaneous with the on-timing of the second pulse selected from the other of the first and second groups G1, G2, on/off states of the first and second pulses cancel each other, and an amount of change in a voltage of the pulse becomes gradual, so that high frequency noise can be reduced.

According to the embodiment described above, as shown in FIG. 8, the CPU 3 creates the schedule such that all the pulses of the group in which the first pulse is selected are turned on in the first half of the one cycle, and all the pulses of the group in which the second pulse is selected are turned on in the latter half of the one cycle of the first pulse. Accordingly, the phases of the pulse of the first group G1 and the pulse of the second group G2 can be shifted by the half cycle, and the high frequency noise can be reduced in a state where the set duties are substantially maintained.

According to the embodiment described above, the CPU 3 does not select, as the first pulse, the pulse that is turned off in the first half of the one cycle in the group in which the first pulse is selected from the first and second groups G1, G2. Accordingly, the phases of the pulse of the first group G1 and the pulse of the second group G2 can be easily shifted by the half cycle.

According to the embodiment described above, the CPU 3 create the schedule in which the on-timing of the remaining pulse (the pulses from the ports ch15 to ch18 in FIG. 7C), that is not selected as the second pulse in the group in which the second pulse is selected from the first and second groups G1, G2, is shifted at the constant interval. Accordingly, since the on-timing of the remaining pulse can be shifted, the high frequency noise can be further reduced.

According to the embodiment described above, every time the first and second soft timer finish counting the set time, the interrupt processing is executed by interrupting the main processing performed by the CPU 3. Accordingly, the program can be easily executed by one CPU 3.

According to the embodiment described above, the soft timer is used as a timer, but a hard timer may be used.

According to the embodiment described above, the CPU 3 arranges the pulses of the first and second groups G1, G2 in the order of values of the duties, but the present invention is not limited thereto. The arrangement order may be any order, and may be an order of arrangement of the ports ch1 to ch18.

According to the embodiment described above, the CPU 3 is used for controlling the LEDs 2 (light source), but the present invention is not limited thereto. The CPU 3 may be used for PWM control of a load, and the load may be a heater or the like.

In the embodiment described above, the interrupt processing is executed using the first and second soft timers, but the present invention is not limited thereto. The interrupt processing may be executed using one soft timer.

Herein, characteristics of the control device, the illumination device, and the program for the control device according to the above embodiment of the present invention are summarized briefly in the following [1] to [9] respectively.

[1] A control device (3) that outputs a plurality of pulses each having a duty set independently, the control device including:
a schedule creation section (3) configured to create a schedule in which on-timing and off-timing of the plurality of pulses are designated such that off-timing of a first pulse among the plurality of pulses and on-timing of a second pulse among the plurality of pulses are simultaneous with each other, based on the set duty and a cycle of the pulse;
a setting section (3) configured to set, in a timer for counting time, time from a time point where the timer finishes counting the time already set to on-timing or off-timing of a pulse to be first turned on or off after the time point in accordance with the schedule; and
a pulse output section (3) configured to turn on or off the pulse in accordance with the schedule when the timer finishes counting the set time.

[2] The control device (3) according to [1],
wherein the schedule creation section (3) creates a schedule for the first pulse, and creates a schedule for the second pulse such that the off-timing of the first pulse designated by the schedule created for the first pulse and the on-timing of the second pulse are simultaneous with each other.

[3] The control device (3) according to [1] or [2],
wherein the schedule creation section (3) divides the plurality of pulses into first and second groups (G1, G2), and includes a first schedule creation section (3) and a second schedule creation section (3),
wherein the first schedule creation section (3) creates the schedule by selecting the first pulse from one of the first and second groups (G1, G2) and selecting the second pulse from another of the first and second groups (G1, G2),
wherein the second schedule creation section (3) creates the schedule by selecting the first pulse from the other of the first and second groups (G1, G2) and selecting the second pulse from the one of the first and second groups (G1, G2), and
wherein the first schedule creation section (3) and the second schedule creation section (3) alternately create a schedule.

[4] The control device (3) according to [3],
wherein the schedule creation section (3) creates the schedule such that all the pulses of the group in which first pulse is selected from the first and second groups (G1, G2) are turned on in the first half of one cycle, and all the pulses of the group in which the second pulse is selected from the first and second groups (G1, G2) are turned on in the latter half of the one cycle of the first pulse.

[5] The control device (3) according to [3], wherein the schedule creation section (3) does not select, as the first pulse, the pulse that is turned off in the first half of the one cycle in the group in which the first pulse is selected from the first and second groups (G1, G2).

[6] The control device (3) according to [3], wherein the schedule creation section (3) creates the schedule in which on-timing of a remaining pulse, that is not selected as the second pulse in the group in which the second pulse is selected from the first and second group (G1, G2), is shifted at a constant interval.

[7] An illumination device (1) including:
the control device (3) according to any one of [1] to [6]; and
a plurality of light sources (2) controlled by a plurality of pulses output from the control device (3).

[8] A control method for a control device (3) that outputs a plurality of pulses each having a duty set independently, the control method comprising:
a schedule creation step (3) configured to create a schedule in which on-timing and off-timing of the plurality of pulses are designated such that off-timing of a first pulse among the plurality of pulses and on-timing of a second pulse among the plurality of pulses are simultaneous with each other, based on the set duty and a cycle of the pulse,
a setting step (3) configured to set, in a timer for counting time, time from a time point where the timer finishes counting the time already set to on-timing or off-timing of a pulse to be first turned on or off after the time point in accordance with the schedule, and
a pulse output step (3) configured to turn on or off the pulse in accordance with the schedule when the timer finishes counting the set time.

[9] The program for the control device (3) according to [8], wherein the setting step (3) and the pulse output step (3) are performed as an interrupt processing by interrupting the schedule creation section (3), every time the timer finishes counting the set time.

[10] A computer readable storage medium on which a program for a control device so as to executing the control method according to [8] or [9] by a computer is stored.

What is claimed is:

1. A control device that outputs a plurality of pulses each having a duty set independently, the control device comprising at least one hardware processor configured to implement:
a schedule creation section configured to create a schedule in which on-timing and off-timing of the plurality of pulses are designated such that off-timing of a first pulse among the plurality of pulses and on-timing of a second pulse among the plurality of pulses are simultaneous with each other, based on the set duty and a cycle of the pulse;
a setting section configured to set, in a timer for counting time, time from a time point where the timer finishes counting the time already set to on-timing or off-timing of a pulse to be first turned on or off after the time point in accordance with the schedule; and
a pulse output section configured to turn on or off the pulse in accordance with the schedule when the timer finishes counting the set time,
wherein the schedule creating section is further configured to rearrange groupings of the pulses in response to determining that a duty of at least one of the pulses has been changed,
wherein the schedule creation section divides the plurality of pulses into first and second groups of the groupings of the pulses, and includes a first schedule creation section and a second schedule creation section,
wherein the first schedule creation section creates the schedule by selecting the first pulse from one of the first and second groups and selecting the second pulse from another of the first and second groups,
wherein the second schedule creation section creates the schedule by selecting the first pulse from the other of the first and second groups and selecting the second pulse from the one of the first and second groups, and
wherein the first schedule creation section and the second schedule creation section alternately create a schedule.

2. The control device according to claim 1, wherein the schedule creation section creates a schedule for the first pulse, and creates a schedule for the second pulse such that the off-timing of the first pulse designated by the schedule created for the first pulse and the on-timing of the second pulse are simultaneous with each other.

3. The control device according to claim 1, wherein the schedule creation section creates the schedule such that all the pulses of the group in which the first pulse is selected from the first and second groups are turned on in the first half of one cycle, and all the pulses of the group in which the second pulse is selected from the first and second groups are turned on in the latter half of the one cycle of the first pulse.

4. The control device according to claim 3, wherein the schedule creation section does not select, as the first pulse, the pulse that is turned off in the first half of the one cycle in the group in which the first pulse is selected from the first and second groups.

5. The control device according to claim 1, wherein the schedule creation section creates the schedule in which on-timing of a remaining pulse, that is not selected as the second pulse in the group in which the second pulse is selected from the first and second group, is shifted at a constant interval.

6. An illumination device including:
the control device according to claim 1; and
a plurality of light sources controlled by a plurality of pulses output from the control device.

7. A control method for a control device that outputs a plurality of pulses each having a duty set independently, the control method implemented by at least one processor and comprising:
a schedule creation step configured to create a schedule in which on-timing and off-timing of the plurality of pulses are designated such that off-timing of a first pulse among the plurality of pulses and on-timing of a second pulse among the plurality of pulses are simultaneous with each other, based on the set duty and a cycle of the pulse,
a setting step configured to set, in a timer for counting time, time from a time point where the timer finishes counting the time already set to on-timing or off-timing of a pulse to be first turned on or off after the time point in accordance with the schedule, and
a pulse output step configured to turn on or off the pulse in accordance with the schedule when the timer finishes counting the set time,
wherein the schedule creation step comprises rearranging groupings of the pulses in response to determining that a duty of at least one of the pulses has been changed wherein the schedule creation step divides the plurality of pulses into first and second groups of the groupings of the pulses, and includes a first schedule creation step and a second schedule creation step, wherein the first schedule creation step creates the schedule by selecting the first pulse from one of the first and second groups and selecting the second pulse from another of the first and second groups, wherein the second schedule creation step creates the schedule by selecting the first pulse from the other of the first and second groups and selecting the second pulse from the one of the first and second groups, and wherein the first schedule creation step and the second schedule creation step alternately create a schedule.

8. The control method according to claim 7, wherein the setting step and the pulse output step are performed as an interrupt processing by interrupting the schedule creation step, every time the timer finishes counting the set time.

9. A non-transitory computer readable storage medium on which a program for a control device so as to executing the control method according to claim 7 by a computer, having the at least one processor, is stored.

10. The control device according to claim 1, wherein the schedule further designates that an off-timing of a third pulse among the plurality of pulses and an on-timing of a fourth pulse among the plurality of pulses are both simultaneous with each other and between an on-timing of the first pulse and the off-timing of the first pulse.

11. The control device according to claim 1, wherein determining that the duty of at least one of the pulses has been changed comprises determining that a vehicle door is at least one of opened and closed.

* * * * *